July 13, 1965

L. WETHERILL 3,195,083

ELECTRICAL SHUNT REACTOR

Filed Feb. 27, 1963

Inventor,
Lynn Wetherill,
by Gilbert P. Tarleton
His Attorney.

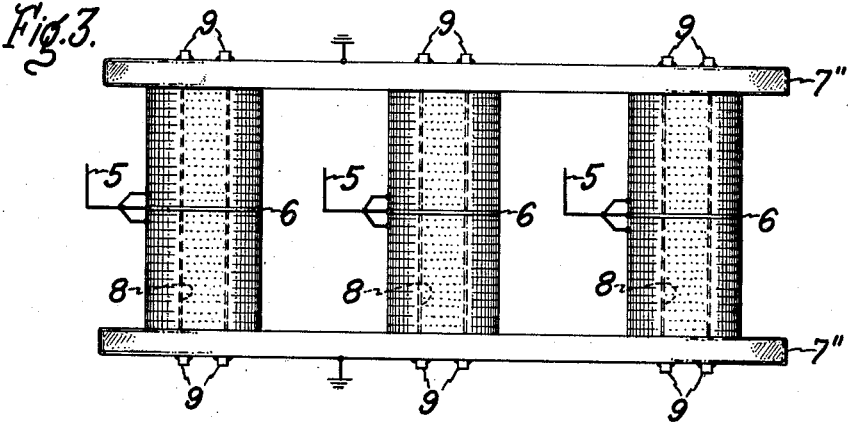
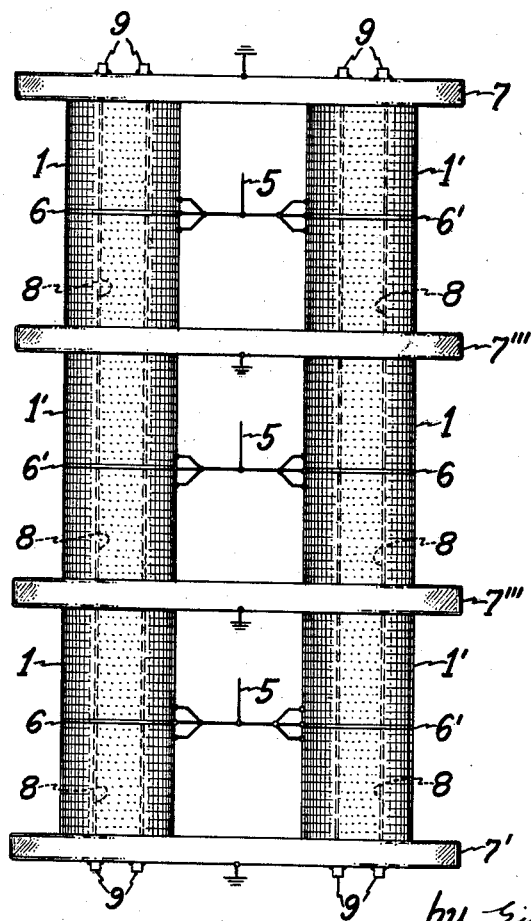

//  # United States Patent Office 3,195,083
Patented July 13, 1965

3,195,083
ELECTRICAL SHUNT REACTOR
Lynn Wetherill, Pittsfield, Mass., assignor to General
Electric Company, a corporation of New York
Filed Feb. 27, 1963, Ser. No. 261,292
3 Claims. (Cl. 336—12)

This invention relates to electrical reactors and more particularly to improvements in high voltage and extra high voltage shunt reactors.

In commercial frequency alternating current electric power transmission the dividing line between high voltage and extra high voltage (hereinafter abbreviated EHV) is not precisely defined, but for present purposes may be taken as 230 kilovolts. The upper limit of EHV is even less distinct, but in view of systems already operating or under construction its present upper limit is at least 800 kilovolts.

Shunt reactors are connected across or in shunt with high voltage and EHV transmission lines to supply or compensate for line charging current. They are very large devices.

This invention is a modification of or improvement on an invention described and broadly claimed in an application Serial No. 261,294, filed concurrently herewith in the name of Alanson U. Welch and assigned to the present assignee. The Welch invention solved a problem in connection with such reactors caused by the magnetic flux assuming a direction at the ends of the reactor winding which was crosswise of the axis or axial direction of the reactor winding. It did this by means of an extra wide continuous yoke extending entirely across and magnetically joining the end faces of the reactor winding.

In accordance with present invention, the necessary amount of magnetic material or steel is reduced by employing two windings positioned side by side and joined on each end by discontinuous straight yoke members. This eliminates the need for magnetic shielding material extending the axial length of the reactor winding and in effect each winding acts as part of the magnetic path for the other one. Another advantage of the present invention over the Welch invention is that the reactor is easier to assemble because as there are no magnetic leg members joining the magnetic yoke members there are no problems of assembling the electrical winding structure and the magnetic shielding structure in such a way as to close joints in the magnetic shielding structure and at the same time have the yoke members pressed firmly against the ends of the coil structure without either crushing it and impairing its insulation on the one hand and providing a high reluctance gap on the other hand. Still another advantage of the present invention over the Welch invention is that by dividing the necessary conductive coil or winding structure into two side by side parallel stacks or cylinders the coil length or height for a given kva. rating is very much shorter and is typically halved. This shorter coil structure is naturally a stiffer column structure and its natural frequency of vibration will not be as near the commercial electrical frequency as in the longer single coil structure of the Welch invention, thus giving improved vibration characteristics to the present invention.

An object of the invention is to provide a new and improved electrical reactor.

Another object of the invention is to provide a new and improved EHV shunt reactor.

A further object of the invention is to provide a new and improved EHV shunt reactor having axially directed flux at the ends of its windings for a minimum amount of external magnetic yoke material.

The invention will be better understood from the following description taken in connection with the accompanying drawing, and its scope will be pointed out in the appended claims.

In the drawing,

FIG. 3 is a modification showing a three-phase reactor embodying the present invention and FIG. 4 shows another form of three phase reactor embodying the present invention.

Figure 1:
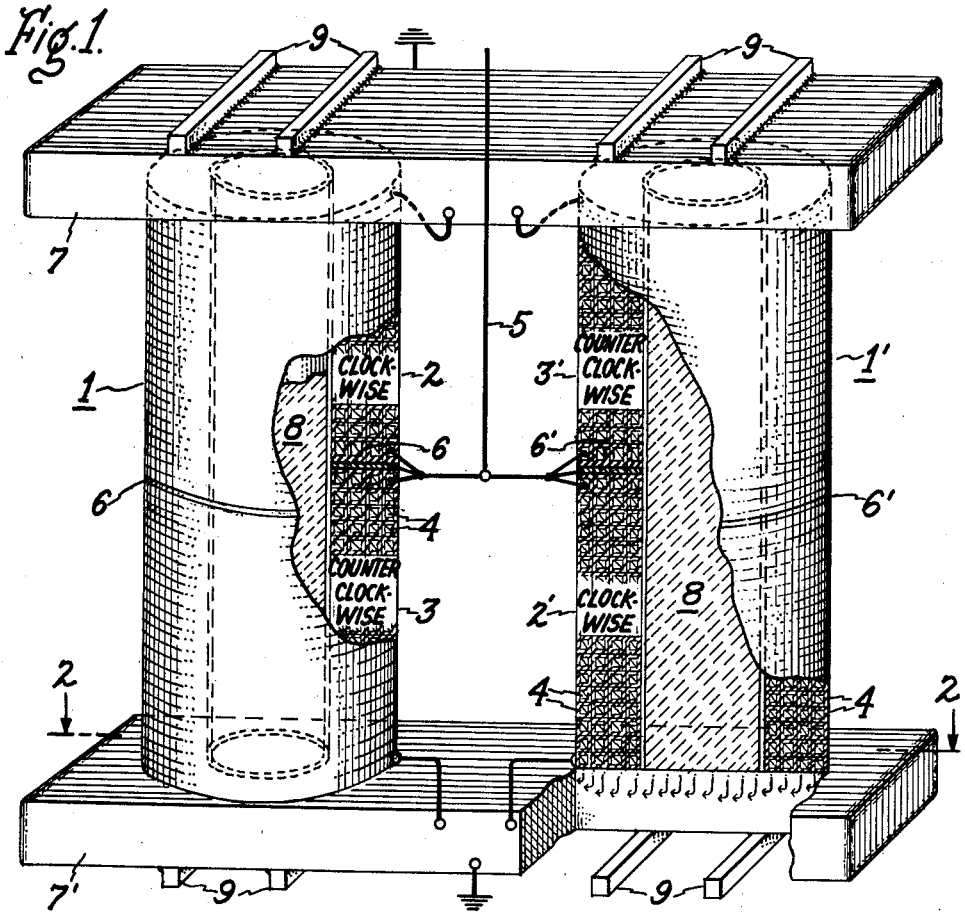
FIG. 1 is an elevation view of the preferred embodiment of the invention.

Referring now to the drawing, the reactor comprises dual or duplicate cylindrical coils 1 and 1' mounted side by side with their axes parallel. In turn these coils consist of essentially duplicate portions or halves 2 and 3 in the case of coil 1 and 2' and 3' in the case of coil 1'. The only essential difference between the portions or halves is that they are wound in opposite directions as indicated, for example, by the legends cw and ccw for clockwise and counterclockwise, respectively. The coil portions or halves are themselves divided into disc or pancake coil sections 4 which are structurally alike throughout the coils except, of course, for their orientation as to winding direction, and these coil sections are serially connected in each counterclockwise, respectively. The coil portions or coil portions 2 and 3 are interconnected to form a center tap of the coil 1 and likewise the adjacent ends of the coil portion 1' and 2' and interconnected to form a center tap of the coil 1', these center taps being in turn interconnected to constitute a line lead 5 of the reactor. For potential stress grading purposes under impulse conditions, the line terminal zones of the coils 1 and 1' are preferably electrostatically shielded by conductive static plate members 6 and 6' connected to the mid-taps of the coils 1 and 1' and effectively embedded in the coils between their two portions. However, of course, they are slit radially or are in the form of narrow strips so as not to constitute a complete or short circuited turn and so as to avoid excessive eddy currents.

For the primary purpose of preventing the magnetic fluxes near the outer ends of the coils 1 and 1' from deviating from the axial direction separate magnetic yoke members 7 and 7' are laid across, or magnetically join, adjacent outer ends of the coils at opposite ends thereof. As shown most clearly in FIG. 2, these yoke members are laminated with the planes of their laminations presented edgewise to the end faces of the conductive coils and the width of the yoke members adjacent the coil ends is at least equal to and preferably somewhat in excess of the outside diameter of the coils or coil sections. In this manner, the path of lowest reluctance of any flux in the coils is in the axial direction in order to get into the magnetic material of the yoke members 7 and 7' which are preferably made of high permeability silicon steel. The outer ends of all of the core portions are electrically connected to their adjacent yoke members which in turn are grounded or operated at ground potential so that no more than disc section coil insulation is necessary between the ends of the coils and the metallic conducting yoke members.

Inside the windows of the coils 1 and 1' are positioned para or nonmagnetic structural columns 8, preferably of insulating material, such as porcelain or glass although electrically conductive material can be used. The ends of these structural columns, which are strong in compression, are essentially flush with the outer end faces of the cylindrical coils and they serve to resist the strong magnetic attractive force between the yokes 7 and 7', which are, of course, at different magnetic polarity at opposite ends of each coil, so as to protect the coil insulation from being crushed or damaged by the high externally applied mechanical forces resulting from the magnetic attraction between the yoke members. Transversely extending stiff steel beams are welded to the edges of the laminations to transmit the force on the outer laminations to the central columns 8.

It will be seen from the above description that the reactor has four electrially parallel paths or current circuits whose magnetomotive forces are cumulative or additive in a common magnetic circuit including the two yoke members and the coils in series.

An additional function of the yoke members 7 and 7' is to act as electrostatic potential grading shields for the grounded ends of the coils under impulse conditions inasmuch as they provide comparatively large conducting or capacitive surfaces at the same potential as and closely adjacent to, the outer ends of the coils.

Figure 2:
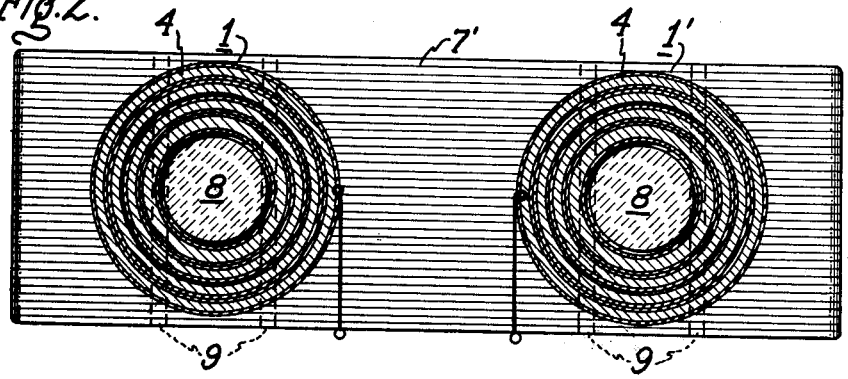
FIG. 2 is a horizontal sectional view taken on line 2—2 of FIG. 1.

Referring now to FIG. 3, there is shown therein a three phase embodiment of the invention in which three divided or dual coils 1 similar to coils 1 or 1' of FIG. 1 are mounted side by side with their axes parallel and with their ends joined by longer yoke members 7'' of a width relative to the diameters of the coils similar to that shown in FIG. 2. As in FIGS. 1 and 2, each coil has a central column 8 of nonmagnetic and preferably electrically non-conducting material such as porcelain or glass for separating the yokes and preventing the magnetic attraction between them and vibratory forces from injuring the coil insulation. The extra long yoke members 7'' are, of course, operated at ground potential as in FIG. 1 so that they constitute the electrical neutral of the reactor which is in effect a Y connected three phase reactor having three line leads 5 as shown.

In the modification shown in FIG. 4 a three phase reactor is provided by in effect stacking three reactors similar to FIG. 1 end to end or one on top of the other. The six coils of the three reactors are thus mouted in two coaxial sets of three each with the two sets disposed in parallel spaced relation. The assembly is provided with two end yokes 7 and 7' and two intermediate yokes 7''' adjacent the ends of the center pair of spaced apart coils. The middle phase preferably has its flux reversed as indicated by the reverse position of its coils 1 and 1', so as to be phase displaced 60 electrical degrees relative to the fluxes of the two end phases in order that the two intermediate yoke members 7''' will carry no more flux than the end yokes 7 and 7'. All of the yokes, of course, operate at ground potential and they constitute the neutral point of a star connection. If the middle phase were not reversed, then the intermediate yoke 7''' would have to be substantially thicker, i.e. their laminations would have to be substantially wider than those of the end yokes 7 and 7' for the same flux density as they would then carry the vector difference between equal fluxes of unit magnitude displaced 120 electrical degrees from each other instead of the vector difference between such fluxes displaced 60 electrical degrees from each other. The latter is equal to unit flux and the former is equal to 1.732 times the latter.

It will, of course, be understood that suitable bracing will be employed in all of the modifications so as to hold the structure together and prevent undue vibration or shifting of the yokes relative to the ends of the coil faces and relative to each other. This can easily be done by springs or other bracing material between the top yoke and the cover of a conventional tank or enclosing casing (not shown) with which reactors are usually provided.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. A shunt reactor having a voltage rating of the order of at least 200 kilovolts comprising, duplicate side-by-side cylindrical conductive coils with their axes parallel, said coils each having a central window corresponding in cross-sectional extent to the inner diameter of said coils and having opposite end faces, solid cores formed of high reluctance paramagnetic material structurally rigid in compression and disposed in said windows, said cores having their ends flush with the end faces of said coils, and a pair of electrically conductive laminated yoke members of low reluctance magnetic material positioned across the adjacent end faces of said coils and cores at opposite ends thereof respectively with their laminations edgewise to said end faces, the width of said yoke portions adjacent the end faces of said coils being at least equal to the outside diameter of said coils, said coils having interconnected center taps comprising the line terminal of said reactor and having their axially opposite ends electrically connected to said yoke members, said yoke members being electrically connected together and to ground thereby to provide four electrically parallel current paths through said reactor, the turns of each coil being oppositely wound between its center tap and its axially opposite ends so that said four current paths produce additive magnetomotive forces in a common magnetic circuit consisting of said coils and yoke members magnetically in series, said yoke members acting as magnetic and electrostatic shields for said coils and said cores alone serving as mechanical separators for said yoke members.

2. A three-phase shunt reactor having a voltage rating of the order of at least 200 kilovolts comprising, three equal length cylindrical cross section electrical coils mounted side by side in spaced relation with their axes parallel, each coil having a mid-tap line connection and having a central nonmagnetic core of structurally strong electrical insulating material with its ends substantially flush with the ends of the coil, a pair of elongated straight laminated magnetic yoke members electrically connected together and positioned in bridging relation between adjacent ends of said coils, the width of the yoke members in the radial direction of the coils being at least equal to the outside diameter of the coils, the axially opposite ends of each said coil being connected to said yoke members and each said coil being oppositely wound between its mid-tap and its axially opposite ends, whereby axially juxtaposed halves of each said coil are connected electrically in parallel circuit relation and disposed magnetically in series additive relation and said three coils are electrically connected in three-phase Y voltage relation.

3. A three-phase shunt reactor having a voltage rating of the order of at least 200 kilovolts comprising, six equal length equal diameter cylindrical electrical coils and four equal width and equal thickness laminated magnetic yoke members, said coils being mounted in two coaxial sets of three each with the sets disposed in parallel spaced relation, two of said yoke members being end yoke members bridged across said outer ends of said sets of coils and two of said yoke members being intermediate yoke members bridged across the opposite ends of said center coils and between the center and end coils of each coaxial set of coils, all said yoke members being as wide in a direction transverse to their laminations as the outside diameter of said coils, the pair of coils between each different pair of yoke members comprising a different phase of the reactor, each of said six coils having a center tap line connection and having its axially opposite ends grounded and connected to the adjacent yoke member thereby to connect the four coil halves of each phase electrically in parallel circuit relation and the axially adjacent halves of each said coil being oppositely wound thereby to dispose the halves of each coil magnetically in series additive relation, the winding directions of the two center coils being reversed relative to the end pairs of coils to minimize flux magnitude in said intermediate yoke members.

References Cited by the Examiner

UNITED STATES PATENTS

| 1,610,867 | 12/26 | Lennox | 336—234 X |
| 2,082,121 | 6/37 | Rypinski | 336—180 X |
| 2,279,239 | 4/42 | Meyerhans | 336—60 X |

FOREIGN PATENTS 1,138,156 10/62 Germany.

JOHN F. BURNS, *Primary Examiner.*